US009544064B2

(12) United States Patent
Olsson et al.

(10) Patent No.: US 9,544,064 B2
(45) Date of Patent: Jan. 10, 2017

(54) ELECTRO-OPTICAL IMPLEMENTATION OF AN OPTICAL SPECTRUM INVERTER

(75) Inventors: Bengt-Erik Olsson, Hovas (SE); Christina Larsson, Molndal (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 69 days.

(21) Appl. No.: 14/415,028

(22) PCT Filed: Jul. 19, 2012

(86) PCT No.: PCT/EP2012/064210
§ 371 (c)(1),
(2), (4) Date: Jan. 15, 2015

(87) PCT Pub. No.: WO2014/012592
PCT Pub. Date: Jan. 23, 2014

(65) Prior Publication Data
US 2015/0222369 A1 Aug. 6, 2015

(51) Int. Cl.
*H04B 10/00* (2013.01)
*H04B 10/61* (2013.01)
(Continued)

(52) U.S. Cl.
CPC ........ *H04B 10/6166* (2013.01); *H04B 10/255* (2013.01); *H04B 10/2531* (2013.01);
(Continued)

(58) Field of Classification Search
CPC . H04B 10/6166; H04B 10/64; H04B 10/6163; H04B 10/2557; H04B 10/2531; H04B 10/255; H04J 14/06; H04J 14/0202; H04L 5/14
See application file for complete search history.

(56) References Cited

U.S. PATENT DOCUMENTS

| 4,965,856 | A * | 10/1990 | Swanic | H04B 10/00 340/555 |
| 2002/0196507 | A1* | 12/2002 | Stuart | H04B 10/2513 398/178 |
| 2010/0166423 | A1* | 7/2010 | Chang | H04J 14/06 398/65 |
| 2010/0329671 | A1* | 12/2010 | Essiambre | G02B 6/14 398/44 |
| 2010/0329698 | A1* | 12/2010 | Nakashima | H04B 10/60 398/208 |
| 2011/0029049 | A1* | 2/2011 | Vertikov | A61B 5/14532 607/104 |
| 2012/0177384 | A1* | 7/2012 | Ryf | G02B 6/29373 398/202 |
| 2012/0177386 | A1* | 7/2012 | Zhou | H04B 10/2513 398/208 |
| 2013/0138375 | A1* | 5/2013 | Zhou | H04B 10/6166 702/66 |
| 2013/0222810 | A1* | 8/2013 | Lefevre | G01J 9/0246 356/477 |
| 2014/0314410 | A1* | 10/2014 | Mumtaz | H04B 10/2581 398/65 |

(Continued)

FOREIGN PATENT DOCUMENTS

EP 0 493 816 A2 7/1992

OTHER PUBLICATIONS

PCT International Search Report, mailed Apr. 2, 2013, in connection with International Application No. PCT/EP2012/064210, all pages.
PCT Written Opinion, mailed Apr. 2, 2013, in connection with International Application No. PCT/EP2012/064210, all pages.

*Primary Examiner* — Danny Leung
(74) *Attorney, Agent, or Firm* — Patent Portfolio Builders, PLLC (57) ABSTRACT

The invention relates to an optical spectrum inverter, configured for counteracting phase distortion effects in an optical channel over a predefined frequency range, to an inverter node, configured for duplex operation in at least two wavelength channels, and to a method for counteracting phase distortion effects in an optical channel. The optical spectrum inverter comprises an optical receiver comprising a polarization diversity unit configured for polarization resolved detection, wherein the optical receiver is configured for receiving an optical input signal comprising a first wavelength span and for converting the optical input signal to an electrical signal, and an optical modulator connectable to the optical receiver and configured for modulating the electrical signal onto an optical signal, wherein the optical modulator comprises an optical filter which is configured for selecting a second wavelength span of the optical signal corresponding to an optical output side band of an inverted spectrum of the optical channel such that phase distortion effects are counteracted at least partly over the predefined frequency range. In this way, an optical spectrum inverter is provided which is simple and cost-effective to realize and allows higher optical power levels in conjunction with a (Continued)

higher capacity per optical channel and is also adapted for longer transmission distances.

12 Claims, 5 Drawing Sheets (51) Int. Cl.
*H04B 10/2531* (2013.01)
*H04B 10/255* (2013.01)
*H04B 10/2557* (2013.01)
*H04J 14/02* (2006.01)
*H04J 14/06* (2006.01)
*H04L 5/14* (2006.01)
*H04B 10/64* (2013.01)

(52) U.S. Cl.
CPC ..... *H04B 10/2557* (2013.01); *H04B 10/6163* (2013.01); *H04B 10/64* (2013.01); *H04J 14/0202* (2013.01); *H04J 14/06* (2013.01); *H04L 5/14* (2013.01)

(56) References Cited

U.S. PATENT DOCUMENTS

2015/0222369 A1* 8/2015 Olsson ............... H04B 10/2531
398/42

* cited by examiner

ELECTRO-OPTICAL IMPLEMENTATION OF AN OPTICAL SPECTRUM INVERTER

TECHNICAL FIELD

The invention relates to an optical spectrum inverter, configured for counteracting phase distortion effects in an optical channel over a predefined frequency range.

BACKGROUND

Optical mid-span spectrum inversion, MSSI for short, is a powerful way to mitigate signal distortions due to non-linear effects in an optical fibre such as self-phase modulation, SPM for short, and cross-phase modulation, XPM for short. SPM occurs when the amplitude of a signal modulates the refractive index of the fibre glass and imposes as phase modulation on the signal itself, i.e. SPM introduces a chirp on the signal. XPM occurs when the amplitude modulation of a signal imposes a phase modulation on another signal, typically on another wavelength or on another optical polarization. SPM and XPM usually cause severe distortion on transmitted data, in particular if the data is encoded as phase states of the optical light. Both, i.e. SPM and XPM, are power dependent and can be neglected for low optical power level but as data rates as well as transmission distances increase, a high optical signal-to-noise ratio, OSNR for short, is needed and thus there is a need to increase the power. In MSSI applications the optical spectrum needs to be inverted in the middle of an optical link, where the link typically comprises at least one transparent optically amplified span before and after the optical spectrum inverter.

Figure 1:
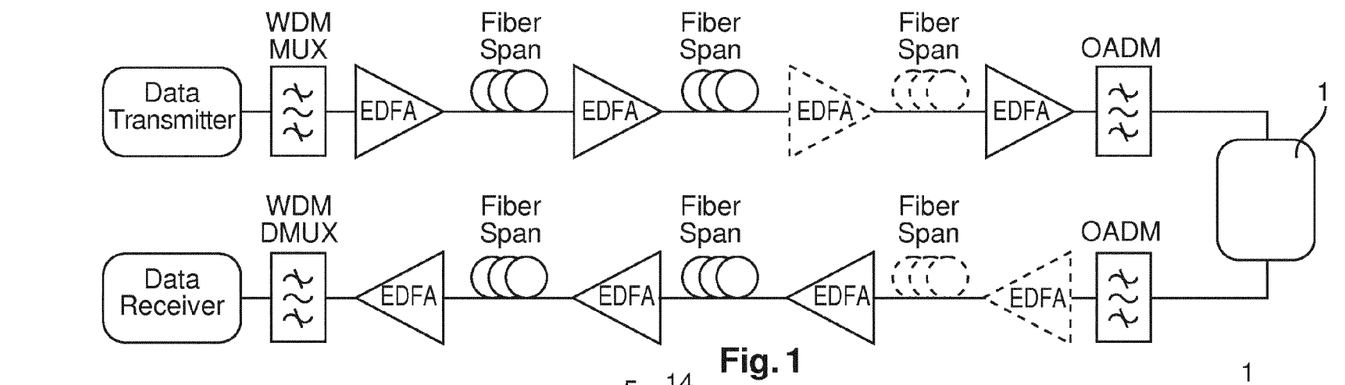
FIG. 1 illustrates a typical fibre optic link with optical spectrum inversion of one WDM channel in the middle of the optical link.

FIG. 1 shows a typical fibre optic link with optical spectrum inversion of one wavelength division multiplex channel, WDM channel for short, in the middle of the optical link. Typically the total link length is several hundreds or even thousands of kilometers long where each span comprises typically a length between 50 km to 100 km. By inverting the optical spectrum in the middle of the optical link, linear and non-linear phase distortion effects in the first half of the fibre could in principle be counteracted in the second half. Since non-linear transmission effects are the main limitation for better utilization of an optical fibre medium it is hard to find a possibility for overcoming capacity restrictions amongst other things.

So far only a few experimental works have addressed MSSI and all experiments used all-optical spectrum inverters that utilize four-wave mixing, FWM for short, in a non-linear optical medium. However, this concept requires a high optical power and cannot convert between the same wavelength at input and output, where the latter is very important in a WDM network. Further, using all-optical technologies for inversion is inherently very broadband and can thus invert several WDM channels at the same time. The absolute wavelengths are changed due to the inversion of the whole spectrum covered which makes this feature not desirable in practice.

SUMMARY

It is the objection of the invention to provide a possibility to obtain higher optical power levels by counteracting non-linear effects in conjunction with being simple and cost-effective to realize, obtaining a high capacity per optical channel and being also adapted for longer transmission distances.

This object is achieved by the subject matter of the independent claims. Preferred embodiments are defined in the sub claims.

According to a first aspect of the invention, this object is achieved by an optical spectrum inverter, configured for counteracting phase distortion effects in an optical channel over a predefined frequency range, comprising an optical receiver comprising a polarization diversity unit configured for polarization resolved detection, wherein the optical receiver is configured for receiving an optical input signal comprising a first wavelength span and for converting the optical input signal to an electrical signal, and an optical modulator connectable to the optical receiver and configured for modulating the electrical signal onto an optical signal, wherein the optical modulator comprises an optical filter which is configured for selecting a second wavelength span of the optical signal corresponding to an optical output side band of an inverted spectrum of the optical channel such that phase distortion effects are counteracted at least partly over the predefined frequency range.

Hence, non-linear effects are managed such that they are almost completely or even fully removed over a predefined frequency range which is selectable dependent on the actual requirements and the optical output power is adjustable. Receiving an optical input signal is preferably accomplished linearly. It is an idea of the invention to connect the output of a simple optical receiver, such as the output of an optical coherent heterodyne receiver, to an optical amplitude modulator in a polarization diversity structure and selecting the optical output side band that comprises the inverted optical channel spectrum. Since optical channel filters are typically present in the optical channel drop and add units of the WDM system, an actual implementation of the optical spectrum inverter becomes very simple and cost-effective. The optical receiver preferably corresponds to an optical coherent heterodyne receiver and the optical modulator preferably corresponds to an optical amplitude modulator. It is noted that the optical modulator preferably comprises at least one of an optical amplitude modulator, an intensity modulator, such as a Michelson interferometer, and a phase modulator. Hence, the general idea is applicable to all kind of optical modulators. It is further noted that the optical spectrum inverter is preferably connectable at both ends to at least one multiplexing unit, MUX for short, and/or to an amplifier. The amplifier preferably corresponds to a plurality of erbium-doped fibre amplifiers, EDFAs for short. One end of the optical spectrum inverter is preferably connectable to a data transmitter, the other end is preferably connectable to a data receiver.

According to a preferred embodiment of the invention, the optical spectrum comprises at least one electrical amplifier connectable to an output of the optical receiver and to an input of the optical modulator, wherein the at least one electrical amplifier is configured for converting the optical input signal of the optical receiver to an electrical signal. In this way, also low optical powers at an output of the optical receiver are handled.

According to a preferred embodiment of the invention, the optical receiver further comprises a first lasing unit configured for providing a local oscillator signal and the optical modulator comprises at least two Mach-Zehnder amplitude modulators and a second lasing unit configured for providing a laser carrier signal. The at least two Mach-Zehnder amplitude modulators are preferably arranged in parallel to each other and the second lasing unit is preferably connectable to the at least two Mach-Zehnder amplitude modulators, wherein the second lasing unit is different from the first lasing unit. Preferably, the first lasing unit and the second lasing unit are tuneable over a predefined wavelength range. According to other preferred embodiments of the invention, at least one lasing unit out of the first lasing unit and the second lasing unit emits a fixed wavelength.

According to a preferred embodiment of the invention, the optical receiver further comprises a first lasing unit configured for providing a local oscillator signal corresponding to the laser carrier signal, wherein the first lasing unit is connectable to the optical modulator and the optical modulator comprises at least two Mach-Zehnder amplitude modulators arranged in parallel to each other. Preferably, the optical spectrum inverter comprises at least two electrical inverters connectable to the optical receiver, wherein an output of each electrical inverter is connectable to at least one out of the at least two Mach-Zehnder amplitude modulators such that the electrical signal at the output of the optical receiver is inverted.

According to a preferred embodiment of the invention, the optical receiver further comprises a detection unit and the polarization diversity unit comprises a polarization splitter configured for separating orthogonal polarization states of the optical input signal into two branches of the optical receiver such that a first and a second polarization signal is provided, wherein the two branches are connectable to the detection unit. The optical receiver preferably comprises a first combiner and a second combiner such that each of the first and the second polarization signal is combined with the local oscillator signal, wherein the first combiner and the second combiner are connectable to the detection unit. Preferably, the detection unit comprises at least one of a photo detector, more preferably a single ended photo detector, and a balanced photo detector pair, and wherein an output of the detection unit is connectable to at least one of the at least one electrical amplifier and the optical modulator. It is noted that when the optical power into the photo detector exceeds a predefined value and/or the input amplitude of the optical modulator fulfils a predefined condition, then no or almost no electrical amplification is required.

According to a preferred embodiment of the invention, the laser carrier signal is directable to the at least two Mach-Zehnder amplitude modulators and the optical modulator further comprises a third combiner, more preferably a polarization combiner, configured for combining the at least two outputs of the at least two Mach-Zehnder amplitude modulators corresponding to at least two different polarization branches of the optical modulator, wherein an output of the third combiner is connectable to the optical filter. The two different polarization branches of the optical modulator preferably comprise a predefined length and the optical filter is configured for selecting the inverted spectrum of the optical channel from a spectrum of the optical signal comprising at least two output side bands that are arranged on each side of the suppressed laser carrier signal such that an optical output side band out of the at least two output side bands is chosen dependent on which side of the input spectrum of the optical input signal the local oscillator signal is located, wherein the output side band chosen corresponds to a mirrored signal of the optical input signal.

According to a preferred embodiment of the invention, the first wavelength span comprises at least partly the same wavelength range as the second wavelength span and the centre wavelength of the first wavelength span is separated by a predetermined factor from the centre wavelength of the second wavelength span, wherein the predetermined factor is proportional to the electrical carrier frequency of the at least one electrical amplifier. Hence, even same wavelength spans are selectable according to an idea of the invention. According to other preferred embodiments, an arbitrary output wavelength is possible. Such a wavelength conversion scenario is attractive in possible network scenarios since wavelength conversion avoids blocking in transparent optical networks.

According to another preferred embodiment of the invention, an electrical bandwidth of the at least two electrical inverters corresponds to an electrical bandwidth of the laser carrier signal such that the electrical spectrum at the output of the at least two Mach-Zehnder amplitude modulators is flipped around the electrical carrier frequency. The term "flipped around the electrical carrier frequency" means that the output spectrum is mirrored by 180° around the electrical carrier frequency in case of using electrical inverters compared to the case when two lasing units and no electrical inverters are used.

According to a second aspect of the invention, above mentioned object is achieved by an inverter node, configured for duplex operation in at least two wavelength channels, comprising a first and a second optical spectrum inverter according to the first aspect of the invention, wherein the first optical spectrum inverter is configured for operating in a different direction than the second optical spectrum inverter. Hence, an inverter node which is cost-effective and transparent up to the designed bandwidth of optical and electrical components is provided. It is noted that the optical spectrum inverter and thus the inverter node are transparent. The term "transparent" means that any amplitude and/or phase information at the input is preserved and copied onto the optical output spectrum but with the spectrum of interest inverted and with an absolute output wavelength defined by the output local oscillator laser and with an optical bandwidth predefined by the coherent receiver. This holds also if the output wavelength is different since the information spectrum is copied onto another wavelength and amplitude and phase are preserved. Furthermore, it is possible to provide an optical output wavelength equal to the optical input wavelength. The output wavelength is preferably arbitrary, more preferably given by the transmitter laser and thus the inverter node provides a transparent optical wavelength converter.

According to a third aspect of the invention, above mentioned object is achieved by a method for counteracting phase distortion effects in an optical channel over a predefined frequency range, comprising the steps: a) detecting an optical input signal comprising a first wavelength span in polarization resolved manner, b) converting the optical input signal to an electrical signal and modulating the electrical signal onto an optical signal, and c) selecting a second wavelength span of the optical signal corresponding to an optical output side band of an inverted spectrum of the optical channel such that phase distortion effects are counteracted at least partly over the predefined frequency range.

BRIEF DESCRIPTION OF THE DRAWINGS

Further objects and advantages of the present invention will become apparent from the following description of the preferred embodiments that are given by way of example with reference to the accompanying drawings. In the figures.

DETAILED DESCRIPTION

Figure 2:
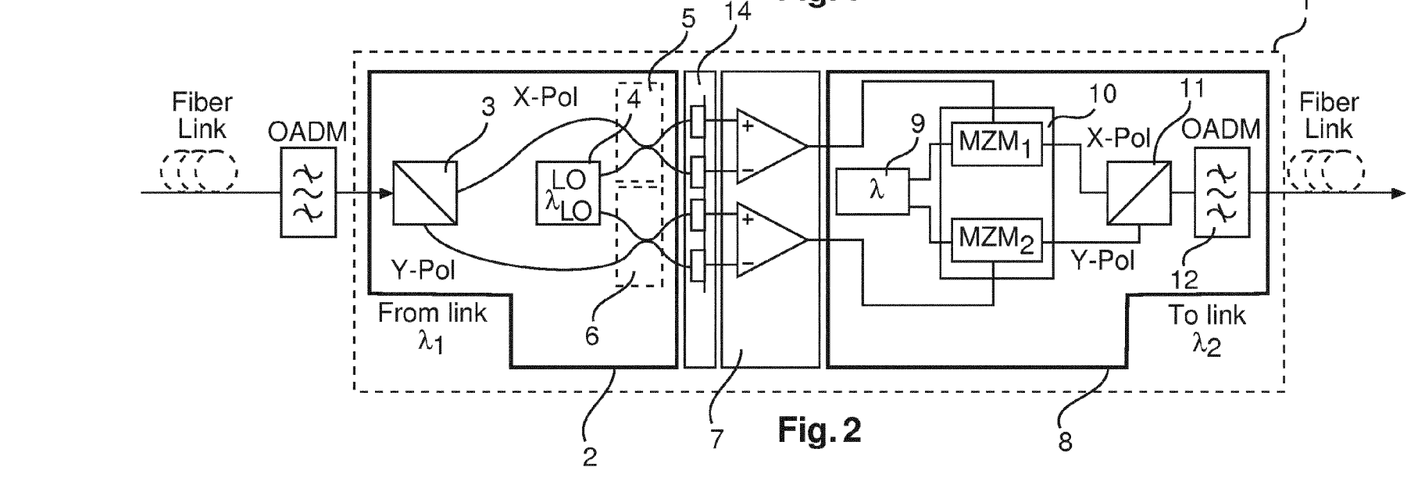
FIG. 2 shows an opto-electrical implementation of an optical spectrum inverter in a polarization diversity structure according to a first preferred embodiment of the invention.

FIG. 2 shows a concept of the optical spectrum inverter 1 according to a first preferred embodiment of the invention. The optical spectrum inverter 1 uses a polarization diversity structure and the WDM channel that has to be inverted is dropped by an optical add-drop multiplexer, OADM for short. The optical spectrum inverter 1 comprises an optical receiver 2, wherein the optical receiver 2 comprises a polarization splitter 3 that separates orthogonal polarization states into two separate branches of the optical receiver 2. Each polarization signal is combined with light from a local oscillator laser 4, LO laser for short, and fed to a photodetector 14 that is a balanced photodetector pair according to the first preferred embodiment of the invention. A first combiner 5 and a second combiner 6 direct the combined local oscillator light 4 and the input signal to the photo detector pair 14. The output from the photo detectors comprise the low frequency part of the multiplied field between the LO laser and the incoming signal, i.e. linear conversion of the optical input signal into the electrical domain is accomplished. The electrical signal is amplified by means of an electrical amplifier 7 and fed to an optical modulator 8. The light into the optical modulator 8 originates from a second laser 9 and the two polarization branches are combined using a second polarization splitter 11 arranged at an output of two Mach-Zehnder amplitude modulators 10 that are arranged in parallel to each other. In order to keep signal quality with respect to polarization mode dispersion, PMD for short, low, the two polarization branches comprise the same length, i.e. the same time delay through the optical spectrum inverter occurs. Hence, the coherent heterodyne receiver converts the optical field into the electrical radio frequency domain, RF domain for short, and the RF signal re-modulates the field onto a new optical field. According to the first preferred embodiment of the invention a conventional Mach-Zehnder amplitude modulator, MZM for short, is used and at the optical output two mirror side bands are generated on each side of the suppressed laser carrier. The optical filter 12 selects the side band which comprises the mirrored signal of the input optical signal such that optical spectrum inversion is accomplished. The actual side band to be used depends on which side of the input spectrum the LO laser is placed. Hence, an optically inverted spectrum is generated at the output regardless of whether the electrical signal spectrum between the optical receiver 2 and the optical modulator 8 is inverted or not. The selection of the mirrored side band is obtained by tuning the output laser in order to position the appropriate side band to the pass-band of the OADM filters of the WDM system according to this preferred embodiment of the invention. Hence, no additional filters are required in the optical spectrum inverter 1.

Figure 3:
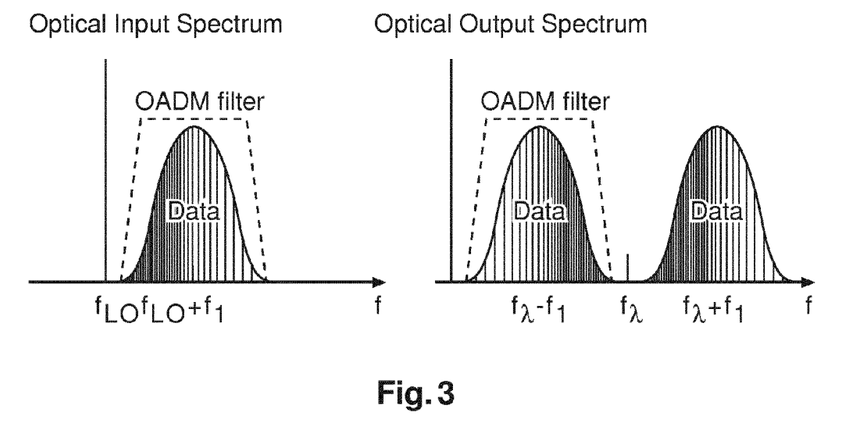
FIG. 3 shows the relation between input and output spectrum of the opto-electrical spectrum inverter according to the first preferred embodiment of the invention.

FIG. 3 shows the relation between input and output of the optical spectrum according to the first preferred embodiment of the invention. The LO laser of the optical spectrum inverter 1 is placed on the low frequency side, intensively shadowed side in FIG. 3, of the data to be inverted. After conversion into the electrical domain, the optical data channel appears on an electrical carrier at frequency $f_1$ with the low data frequency components, intensively shadowed in FIG. 3, at frequencies below $f_1$ and high frequency components above $f_1$. All properties of the optical data channel, including amplitude and phase information, are maintained after conversion onto the electrical carrier $f_1$. Upon amplitude modulation on a new laser carrier, two mirrors of the data channel on frequency $f_1$ appear on both sides of the laser frequency $f_\lambda$ with the low data frequency components, intensively shadowed in FIG. 3, closest to the laser carrier. According to this first preferred embodiment an inverted copy of the original input data spectrum is obtained by selecting the optical signal on frequency $f_\lambda - f_1$. In this first preferred embodiment of the invention, both lasers are tuneable in order to support conversion of arbitrary dense wavelength division multiplex channels, DWDM channels for short, in a system and the centre frequency of the OADM filter is fixed. Hence, the output laser is tuned such that the inverted signal spectrum appears at the centre wavelength of the output OADM filter, i.e. at $f_\lambda - f_1$.

Figure 4:
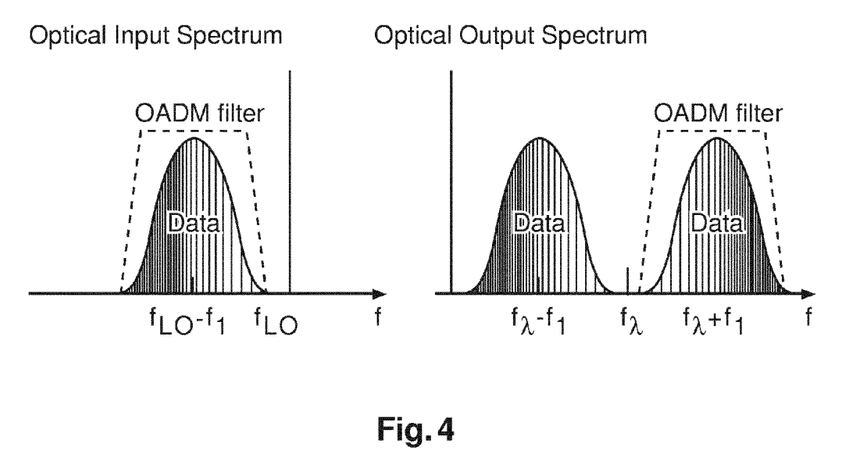
FIG. 4 shows the relation between input and output spectrum of the opto-electrical spectrum inverter with the local oscillator laser placed on the high frequency side of the input data channel spectrum according to a preferred embodiment of the invention.

According to other preferred embodiments of the invention, the LO laser frequency is placed on the high frequency side of the input optical data channel as shown in FIG. 4, where the relation between input and output spectrum of the opto-electrical spectrum inverter with the LO laser placed on the high frequency side of the input data channel spectrum is shown. Hence, the local oscillator signal can be put on either side of the input signal spectrum. After conversion into the electrical domain, the data channel again appears on frequency $f_1$ but with the optical high-frequencies, rarely shaded in FIG. 4, on the electrical low frequency side of $f_1$. After amplitude modulation onto a new laser carrier the electrical low frequency components will appear closest to the laser carrier and in order to obtain an inverted copy of the original data signal, the data channel on frequency $f_\lambda + f_1$ is selected as shown in the output spectrum in FIG. 4. The output signal represents a perfect or an almost perfect phase-conjugated replica of the input signal regardless of modulation format, including all possible impairments affecting the signal in the first half of the optical link, including chromatic dispersion, CD for short, PMD and non-linear impairments. The term "perfect phase-conjugated replica of the input signal" refers to the fundamental principle of phase conjugation of an optical signal where also the orthogonal polarization state of the input signal polarization state is generated. Preferably, the polarization state of the input signal is maintained even though its impact on the performance in a straight line transmission link like in FIG. 1 is neglectable or even not present. According to yet other preferred embodiments of the invention either maintaining the polarization state or flipping it to the orthogonal state after spectrum inversion is done. If the two orthogonal polarization state signals are swapped into the output polarization combiner, a "perfect phase-conjugated replica of the input signal" is obtained.

According to other preferred embodiments of the invention, optical intensity modulators or phase modulators are utilized. Some residual energy at the transmitter laser frequency will usually be present at the output of the spectrum inverter for such types of modulators. This residual carrier energy is then removed by the OADM filter or other optical filters before entering the communication link. It is noted that in most cases, this residual laser carrier does not have an impact on the overall transmission performance in the second part of the optical link. In some cases this might slightly increase the total optical power in the link.

Figure 5:
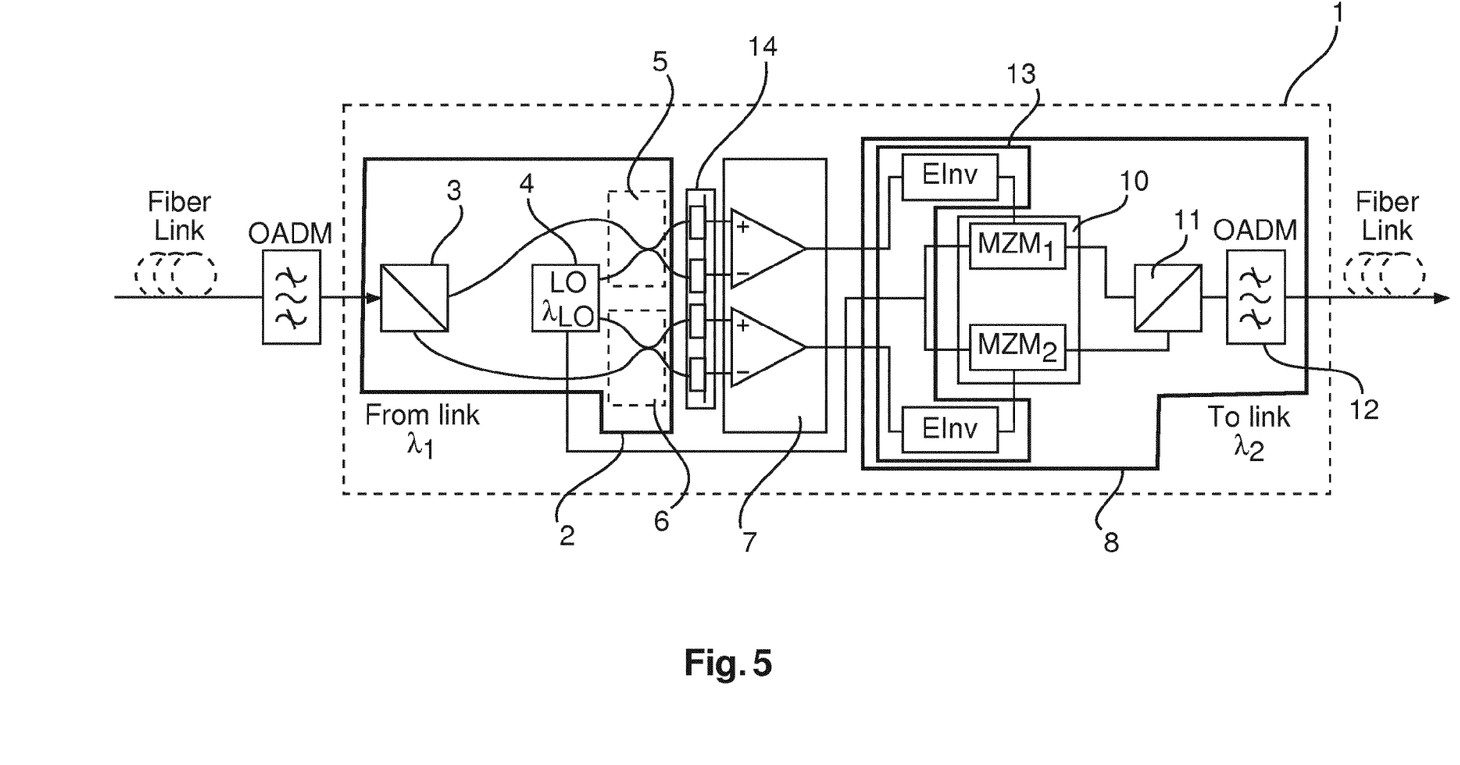
FIG. 5 shows the opto-electrical spectrum inverter with electrical inverters in order to allow laser frequency reuse according to a second preferred embodiment of the invention.

According to the first preferred embodiment of the invention the receiver and transmitter lasers operate on different wavelengths, separated by a frequency $2 \times f_1$, wherein $f_\lambda = f_{LO} + 2 \times f_1$ holds. It is noted that these two optical frequencies are derived from a single laser source according to other preferred embodiments of the invention. Therefore, it is possible to share the same light source for use in both the receiver part and the transmitter part of FIG. 2. This is done by utilizing an electrical spectrum inverter between the receiver and transmitter section as shown in FIG. 5. FIG. 5 representing the second preferred embodiment of the invention.

FIG. 5 shows that one laser is sufficient in the inverter node according to the second preferred embodiment of the invention. The electrical spectrum inverter allows $f_\lambda = f_{LO}$ maintaining the optical centre frequency of the inverted data signal. Hence, two electrical inverters 13, indicated as EInv in FIG. 5, are connected to the two Mach-Zehnder amplitude modulators 10. Therefore, the electrical spectrum inverter flips the electrical spectrum around the centre frequency $f_1$ for which the electrical bandwidth of the electrical inverters matches the signal bandwidth.

Figure 6:
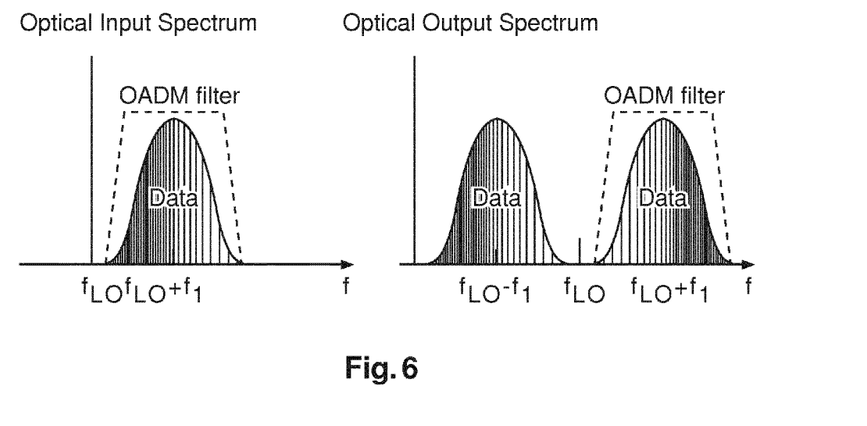
FIG. 6 shows an optical input and output spectrum with electrical spectrum inverters around the electrical carrier frequency $f_1$ in order to allow same wavelength in receiver and transmitter laser according to the second preferred embodiment of the invention.

FIG. 6 shows the optical input and output spectrum with electrical spectrum inverters around the electrical carrier frequency $f_1$ in order to allow the same wavelengths in receiver and transmitter laser according to the second preferred embodiment of the invention. Hence, one laser source is used in the inverter node. Comparing FIG. 6 to FIG. 3 one notices that the output spectrum is flipped. Electrical spectrum inversion shows the advantage that the costs of electrical circuits required for electrical spectrum inversion is less than the costs of an additional laser, in particular of an additional tuneable laser.

Figure 7:
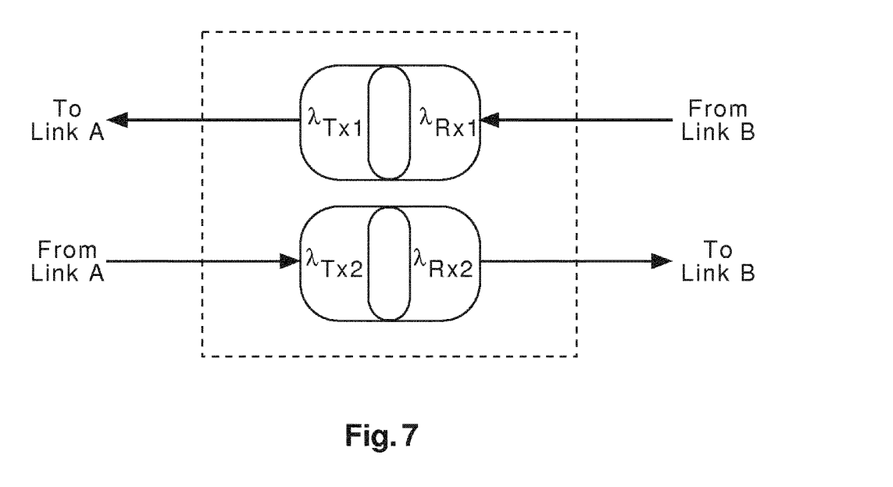
FIG. 7 shows a duplex inverter node with different laser wavelengths required according to a third preferred embodiment of the invention.

FIG. 7 shows an inverter node configured for duplex operation with different laser wavelengths used according to a third preferred embodiment of the invention. Duplex operation is utilized in a network scenario, where two spectrum inverters are present in the same node operating on two wavelength channels but in different directions. Such an inverter node is schematically illustrated in FIG. 7. Applying the concept of FIG. 7 to FIG. 2, i.e. sharing two lasers, $\lambda_{TX1} = \lambda_{TX2}$ and $\lambda_{RX1} = \lambda_{RX2}$ holds. Applying the concept of FIG. 7 to FIG. 5, i.e. using one laser only, all wavelengths are equal, i.e. $\lambda_{TX1} = \lambda_{TX2} = \lambda_{RX1} = \lambda_{RX2}$.

According to other preferred embodiments of the invention the optical spectrum inverter is used in at least one of an optical long distance transmission system and fibre optic sensors that rely on distributed sensing along the optical fibre. By putting an inverter in the middle of the sensing fibre, all constant and low frequency linear and/or nonlinear disturbances will be self compensated by matching the first and second halves of the fibre. Such fibre optic sensors are commonly used in e.g. aircrafts to measure strain and/or fatigue or in airplane wings. According to yet other preferred embodiments such fibre optic sensors are used for distributed intrusion sensing along fences enclosing sensitive or secret areas. In principle a plurality of MSSIs could be used. Referring to FIG. 1 up to one between every other fibre span can be used, i.e. nonlinearities in one span is compensated in the next one by means of an inverter. The latter statement also holds when the optical spectrum inverter is utilized in a communication system, such as an optical long distance transmission system.

Figure 8:
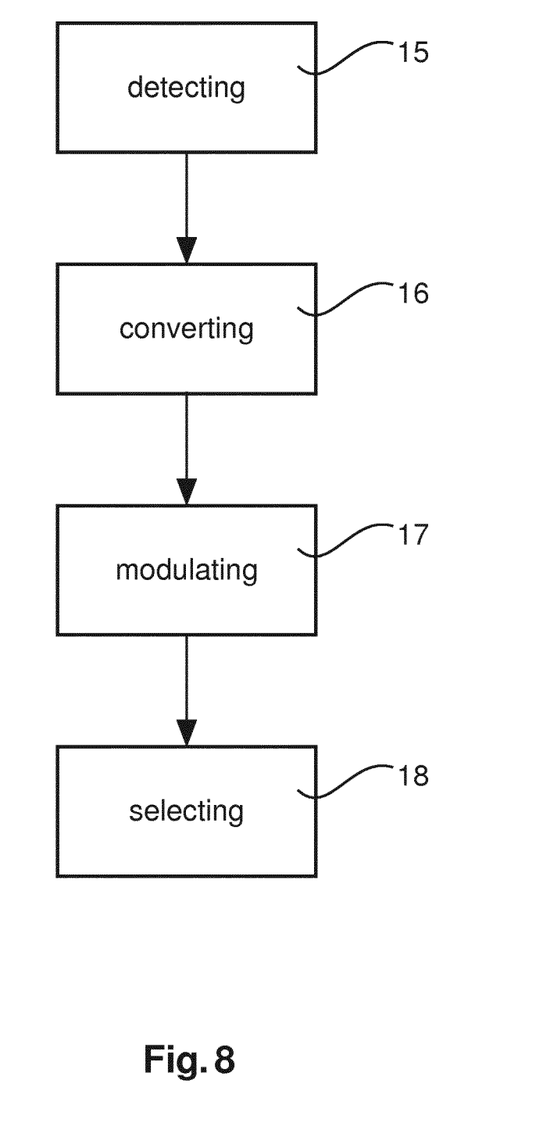
FIG. 8 illustrates the steps of a method for counteracting phase distortion effects in an optical channel according to a fourth preferred embodiment of the invention.

FIG. 8 illustrates the steps of a method for counteracting phase distortion effects in an optical channel according to a fourth preferred embodiment of the invention. The method comprises the steps of detecting 15 an optical input signal comprising a first wavelength span in polarization resolved manner, converting 16 the optical input signal to an electrical signal and modulating 17 the electrical signal onto an optical signal, and selecting 18 a second wavelength span of the optical signal corresponding to an optical output side band of an inverted spectrum of the optical channel such that phase distortion effects are counteracted at least partly over the predefined frequency range.

While the invention has been illustrated and described in detail in the drawings and foregoing description, such illustration and description are to be considered illustrative or exemplarily and not restrictive; the invention is not limited to the disclosed embodiments.

Other variations to the disclosed embodiments can be understood and affected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that the combination of these measures cannot be used to advantage. Any reference signs in the claims should not be construed as limiting the scope.

The invention claimed is:

1. An optical spectrum inverter, configured for counteracting phase distortion effects in an optical channel over a predefined frequency range, comprising:

an optical receiver comprising a polarization diversity unit configured for polarization resolved detection, wherein the optical receiver is configured for receiving an optical input signal comprising a first wavelength span and for converting the optical input signal to an electrical signal; and an optical modulator connectable to the optical receiver and configured for modulating the electrical signal onto an optical signal, wherein the optical modulator comprises an optical filter which is configured for selecting a second wavelength span of the optical signal corresponding to an optical output side band of an inverted spectrum of the optical channel such that phase distortion effects are counteracted at least partly over the predefined frequency range, wherein the optical receiver further comprises:

a first lasing unit configured for providing a local oscillator signal, and a detection unit, wherein the polarization diversity unit comprises a polarization splitter configured for separating orthogonal polarization states of the optical input signal into two branches of the optical receiver such that a first and a second polarization signal is provided, wherein the two branches are connectable to the detection unit; and wherein the optical modulator further comprises at least two Mach-Zehnder amplitude modulators and a second lasing unit configured for providing a laser carrier signal.

2. The optical spectrum inverter according to claim 1, comprising at least one electrical amplifier connectable to an output of the optical receiver and to an input of the optical modulator, wherein the at least one electrical amplifier is configured for converting the optical input signal of the optical receiver to an electrical signal.

3. The optical spectrum inverter according to claim 1, wherein the at least two Mach-Zehnder amplitude modulators are arranged in parallel to each other and the second lasing unit is connectable to the at least two Mach-Zehnder amplitude modulators wherein the second lasing unit is different from the first lasing unit.

4. The optical spectrum inverter according to claim 1, wherein the first lasing unit is further configured for providing the local oscillator signal corresponding to the laser carrier signal, and wherein the first lasing unit is connectable to the optical modulator and the at least two Mach-Zehnder amplitude modulators are arranged in parallel to each other.

5. The optical spectrum inverter according to claim 4, comprising at least two electrical inverters connectable to the optical receiver, wherein an output of each electrical inverter is connectable to at least one out of the at least two Mach-Zehnder amplitude modulators such that the electrical signal at the output of the optical receiver is inverted.

6. The optical spectrum inverter according to claim 1, wherein the optical receiver further comprises a first combiner and a second combiner such that each of the first and the second polarization signal is combined with the local oscillator signal, wherein the first combiner and the second combiner are connectable to the detection unit.

7. The optical spectrum inverter according to claim 2, wherein the detection unit comprises at least one of a photo detector and a balanced photo detector pair, and wherein an output of the detection unit is connectable to at least one of the at least one electrical amplifier and the optical modulator.

8. The optical spectrum inverter according to claim 6, wherein the laser carrier signal is directable to the at least two Mach-Zehnder amplitude modulators and wherein the optical modulator further comprises a third combiner configured for combining the at least two outputs of the at least two Mach-Zehnder amplitude modulators corresponding to at least two different polarization branches of the optical modulator, wherein an output of the third combiner is connectable to the optical filter.

9. The optical spectrum inverter according to claim 8, wherein the two different polarization branches of the optical modulator comprise a predefined length and the optical filter is configured for selecting the inverted spectrum of the optical channel from a spectrum of the optical signal comprising at least two output side bands that are arranged on each side of the suppressed laser carrier signal such that an optical output side band out of the at least two output side bands is chosen dependent on which side of the input spectrum of the optical input signal the local oscillator signal is located, wherein the output side band chosen corresponds to a mirrored signal of the optical input signal.

10. The optical spectrum inverter according to claim 2, wherein the first wavelength span comprises at least partly the same wavelength range as the second wavelength span and the centre wavelength of the first wavelength span is separated by a predetermined factor from the centre wavelength of the second wavelength span, wherein the predetermined factor is proportional to the electrical carrier frequency of the at least one electrical amplifier.

11. The optical spectrum inverter according to claim 5, wherein an electrical bandwidth of the at least two electrical inverters corresponds to an electrical bandwidth of the laser carrier signal such that the electrical spectrum at the output of the at least two Mach-Zehnder amplitude modulators is flipped around the electrical carrier frequency.

12. An inverter node, configured for duplex operation in at least two wavelength channels, comprising a first and a second optical spectrum inverter according to claim 1, wherein the first optical spectrum inverter is configured for operating in a different direction than the second optical spectrum inverter.

* * * * *